(12) United States Patent
Matsushita

(10) Patent No.: US 10,324,287 B2
(45) Date of Patent: Jun. 18, 2019

(54) HEADS-UP DISPLAY DEVICE

(71) Applicant: Yazaki Corporation, Minato-ku, Tokyo (JP)

(72) Inventor: Junichi Matsushita, Susono (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 113 days.

(21) Appl. No.: 15/220,513

(22) Filed: Jul. 27, 2016

(65) Prior Publication Data

US 2016/0334622 A1 Nov. 17, 2016

Related U.S. Application Data

(63) Continuation of application No. PCT/JP2015/050765, filed on Jan. 14, 2015.

(30) Foreign Application Priority Data

Jan. 27, 2014 (JP) .................................. 2014-012453

(51) Int. Cl.
| | |
|---|---|
| *G06K 7/10* | (2006.01) |
| *G03H 1/00* | (2006.01) |
| *G02B 27/14* | (2006.01) |
| *G02B 27/12* | (2006.01) |
| *H04N 7/00* | (2011.01) |

(Continued)

(52) U.S. Cl.
CPC .......... *G02B 27/0101* (2013.01); *B60K 35/00* (2013.01); *G02B 5/208* (2013.01); *B60K 2350/203* (2013.01); *B60K 2350/2052* (2013.01); *B60K 2350/2065* (2013.01)

(58) Field of Classification Search
CPC ............ G02B 27/0172; G02B 27/0101; G02B 2027/0178; G02B 2027/0132; G02B 2027/011; G02B 27/01
USPC ........ 359/630–634, 409–410, 462, 466, 639, 359/626, 13–14, 404, 407; 348/115; 345/7, 9, 156; 349/11; 701/1; 310/49 R, 310/156.32–156.35, 266–268, 156.02; 340/438, 980, 995.1, 815.47, 815.74
See application file for complete search history.

(56) References Cited

U.S. PATENT DOCUMENTS

| | | |
|---|---|---|
| 2006/0203351 A1 | 9/2006 | Kageyama et al. |
| 2007/0285810 A1 | 12/2007 | Brynielsson |

(Continued)

FOREIGN PATENT DOCUMENTS

| | | |
|---|---|---|
| JP | H09-043531 A | 2/1997 |
| JP | 2004-189112 A | 7/2004 |

(Continued)

OTHER PUBLICATIONS

Mar. 10. 2015—International Search Report—Intl App PCT/JP2015/050765.

(Continued)

*Primary Examiner* — Dawayne Pinkney
(74) *Attorney, Agent, or Firm* — Banner & Witcoff, Ltd.

(57) ABSTRACT

There is provided a head-up display apparatus including: a display device that is provided inside an instrument panel and projects display light, and an optical member that reflects the display light projected from the display device so as to guide the display light to a windshield. At least a part of the optical member is positioned outside the instrument panel.

7 Claims, 2 Drawing Sheets

(51) Int. Cl.
  *G09G 5/00* (2006.01)
  *G02F 1/1335* (2006.01)
  *G05D 1/00* (2006.01)
  *G02B 27/01* (2006.01)
  *B60K 35/00* (2006.01)
  *G02B 5/20* (2006.01)

(56) References Cited

U.S. PATENT DOCUMENTS

2010/0128271 A1* 5/2010 Maekawa .............. G02B 27/22
 356/435
2011/0074657 A1* 3/2011 Sugiyama .......... G02B 27/0101
 345/7
2014/0362448 A1* 12/2014 Yamada ............. G02B 27/0101
 359/631

FOREIGN PATENT DOCUMENTS

| JP | 2004-347633 A | 12/2004 |
| JP | 2005-309196 A | 11/2005 |
| JP | 2006-248323 A | 9/2006 |
| JP | 2008296635 A * | 12/2008 |
| JP | 2010-117541 A | 5/2010 |
| JP | 2012-203090 A | 10/2012 |

OTHER PUBLICATIONS

Aug. 2, 2016—(WO) International Preliminary Report on Patentability—Intl App PCT/JP2015/050765, Eng Tran.
Jul. 20, 2017—(JP) Notification of Reasons for Refusal—App 2014-012453, Eng Tran.
Dec. 12, 2017—(JP) Notification of Reasons for Refusal—App 2014-012453, Eng Tran.

* cited by examiner

HEADS-UP DISPLAY DEVICE

CROSS REFERENCE TO RELATED APPLICATIONS

This application is a continuation of PCT application No. PCT/JP15/050765, which was filed on Jan. 14, 2015 based on Japanese Patent Application (No. 2014-012453) filed on Jan. 27, 2014, the contents of which are incorporated herein by reference.

BACKGROUND OF THE INVENTION

1. Field of the Invention

The present invention relates to a head-up display apparatus.

2. Description of the Related Art

In the related art, a head-up display apparatus (hereinafter, also referred to as an HUD apparatus, in some cases), which is mounted in a vehicle so as to be used, has been known (for example, see PTLs 1 and 2).

For example, in the HUD apparatus, display light projected from a display device is guided to the windshield through a reflective member or the like, and the display light reflected from the windshield is visually recognized by a driver. In the HUD apparatus, since a display image as a virtual image is formed at a position in front of the windshield in a traveling direction (that is, in a background in a visual-recognition direction of the driver), it is advantageous that the driver completes, in a short time, focusing required for visual recognition of a display image. In addition, according to the HUD apparatus, since it is possible to visually recognize the display image formed in front of the windshield in the traveling direction by superimposing the image on a sight in front of the vehicle that is recognized through the windshield, it is possible to present information in a new mode different from a display performed by using a common display panel. Further, as a reflective surface of the display light, an optical member (half mirror), which is referred to as a combiner, is used in some cases, instead of the windshield.

[PTL 1] JP-A-2012-203090

SUMMARY OF THE INVENTION

The HUD apparatus illustrated in FIG. 1 in PTL 1 includes a display device, a concave mirror (optical member), a concave lens (optical member), a windshield, an operational switch, and a control device. Here, the display device, the concave mirror, the concave lens, and the control device are accommodated in a space demarcated in the inside of the instrument panel.

However, in such a configuration, the respective members need to be provided so as to avoid interfering with a structural body or a functional component (for example, a meter unit, an air-conditioning pipe, or the like) disposed inside the instrument panel, and thus, it is difficult to satisfy mounting conditions in some cases.

The present invention is made in view of these circumstances, and thus, an object thereof is to provide a head-up display apparatus which is improved in mountability.

In order to achieve the object described above, a head-up display apparatus according to the present invention is characterized by the following features.

(1) The head-up display apparatus includes:
a display device that is provided inside an instrument panel and projects display light having a certain wavelength band; and
at least one optical member that reflects or transmits the display light projected from the display device so as to guide the display light to a windshield or a combiner,
wherein the at least one optical member includes an optical member which reflects only light having the wavelength band, and
at least a part of the at least one optical member is positioned outside the instrument panel, In the head-up display apparatus according to (1) above, since at least a part of the optical member is positioned outside the instrument panel, a portion disposed inside the instrument panel can be reduced, compared to a case where the entirety of the optical member is accommodated inside the instrument panel. Therefore, in the head-up display according to (1) above, it is possible to reduce occurrence of interference of the members with a structural body or a functional component which is disposed inside the instrument panel and thus, it is possible to improve mountability.

Incidentally, in recent years, there has been a demand for a head-up display apparatus in which a display having a wider perspective than in the related art can be realized. In order to achieve the display having a wide perspective corresponding to the demand, an optical member (that is, large reflective surface or transmissive surface in horizontal and vertical directions) larger than that in the related art is used in some cases. In the case where such a large-sized optical member is disposed inside the instrument panel, an additional problem arises in that it is further difficult to avoid the member interfering with a structural body or a functional component which is disposed inside the instrument panel.

In this respect, in the head-up display apparatus according to (1) above, since at least a part of the optical member is positioned outside the instrument panel, it is possible to reduce occurrence of interference of the members with a structural body or a functional component which is disposed inside the instrument panel and thus, it is possible to improve mountability even in the case where a large-sized optical member is used.

Incidentally, in the head-up display apparatus, in some cases, sunlight transmitted through the windshield or the combiner is concentrated on the display device via a route reverse to an optical path from the display device to the windshield or the combiner. There is a concern that the concentration of the sunlight will have an adverse effect on the display device or an element disposed on the periphery thereof due to a temperature increase.

In this respect, in the head-up display apparatus according to (1) above, since the optical member reflects only light having the wavelength band which is projected from the display device, it is possible to reduce the amount of sunlight reaching the display device and it is possible to prevent the adverse effect on the display device or the like.

In addition, in the head-up display apparatus according to (1) above, since the optical member transmits light not having the predetermined wavelength band, the optical member transmits virtually the entirety of extraneous light. Therefore, a driver can visually recognize an outside sight through the portion of the optical member exposed to the outside of the instrument panel. In other words, when a part of the optical member is simply exposed to the outside of the instrument panel, it is not possible for the driver to visually recognize the outside sight through a position at which the optical member positions. However, in the head-up display apparatus according to (1) above, since the outside sight can be visually recognized through the optical member, a field of view is not narrowed. As a result, it is possible to enhance a design quality thereof. In addition, since the optical member is improved in reflection ratio, it is possible to improve display efficiency.

(2) In the head-up display apparatus according to (1) above, the at least one optical member may include an optical member which is subjected to processing of transmitting an infrared ray.

In the head-up display apparatus according to (2) above, since the optical member is subjected to the processing of transmitting an infrared ray, it is possible to reduce the amount the infrared rays, which are contained in the sunlight, reaching the display device and thus, it is possible to prevent an adverse effect on the display device.

According to the present invention, it is possible to provide a head-up display apparatus which is improved in mountability.

As above, the present invention is briefly described. Further, the following description of embodiments of the invention is provided with reference to the accompanying drawings and thereby, the details of the present invention will become clearer.

DETAILED DESCRIPTION OF THE EXEMPLARY EMBODIMENTS

Hereinafter, an embodiment of the present invention will be described with reference to FIGS. 1 and 2.

A head-up display apparatus (hereinafter, also referred to as an HUD apparatus in some cases) 1 according to the embodiment is used and mounted in a common vehicle. FIG. 1 illustrates the interior of a vehicle, and it is assumed that a driver U sits in a vehicle interior 81 separated from the outside by a windshield 51. An instrument panel 61, in which a steering wheel 83 or the like is provided, is disposed in front of the driver U.

Figure 1:
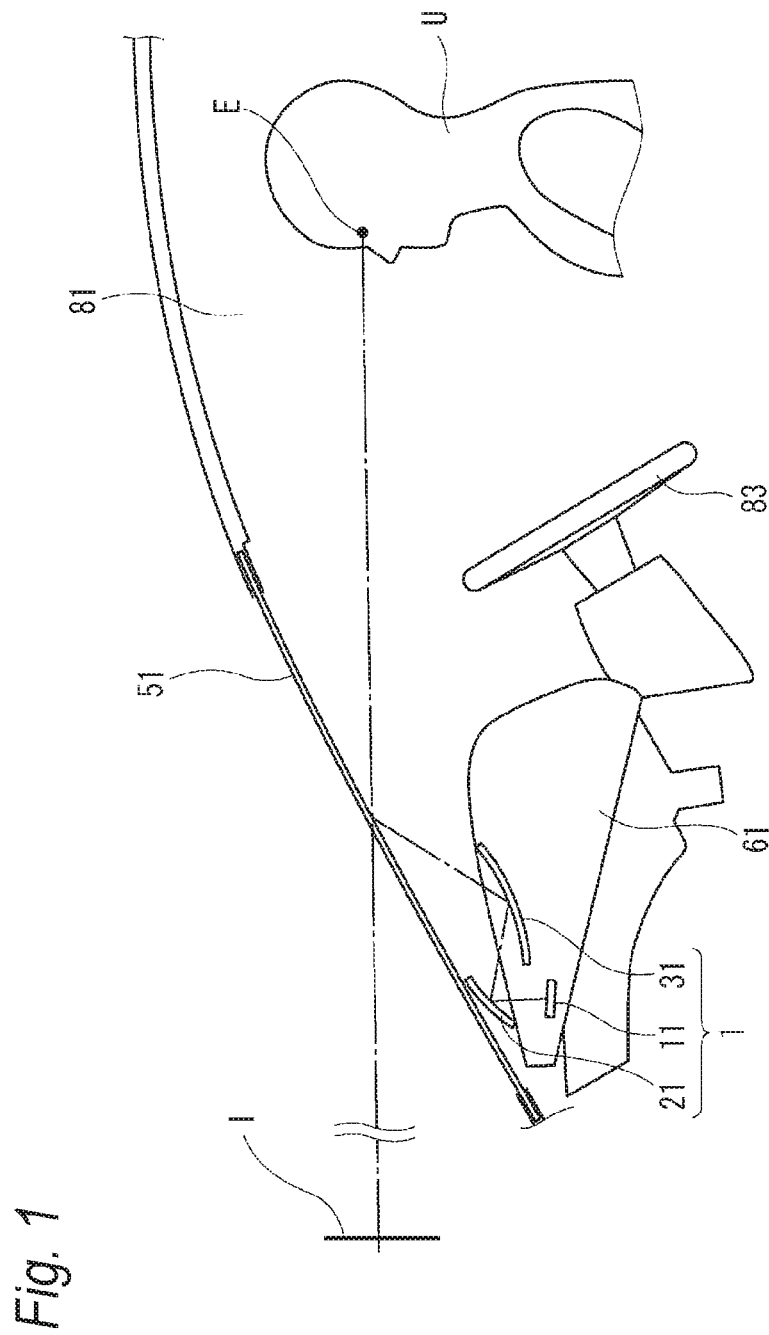
FIG. 1 is a side view schematically illustrating a configuration and a disposition of an HUD apparatus according to an embodiment.

As illustrated in FIG. 1, the HUD apparatus 1 includes, as main configuration, a display device 11, a first aspherical mirror 21, and a second aspherical mirror 31. The display device 11 and the second aspherical mirror 31 are disposed inside the instrument panel 61. The entirety of the first aspherical mirror 21 is disposed to be exposed to the outside of the instrument panel 61. Further, similar to an HUD apparatus in the related art, the HUD apparatus 1 actually includes, as another configuration, a control device, an operation switch, or the like, which controls the display device 11; however, the member is not shown in FIG. 1 for simplicity of description.

Schematically, in the HUD apparatus 1, similar to the HUD apparatus in the related art, display light projected from the display device 11 is guided to the windshield 51 through the first aspherical mirror 21 and the second aspherical mirror 31 which are reflective members and a driver U having an eye-point E visually recognizes the display light reflected from the windshield 51. In the HUD apparatus 1, a display image as a virtual image is formed at a position in front of the windshield 51 in a traveling direction (that is, backward in a visual-recognition direction). In FIG. 1, reference sign I represents the virtual image. In addition, since the windshield 51 transmits light incident thereto from the front side of the vehicle, the driver can visually recognize a sight in front of the vehicle through the windshield 51. In other words, the driver can visually recognize the display image formed in front of the windshield in the traveling direction, which is superimposed on the sight in front of the vehicle.

The display device 11 is, for example, a liquid crystal display unit, and projects, toward the first aspherical mirror 21 display light containing the display image for being visually recognized by the driver in response to instructions from the control device not illustrated.

The first aspherical mirror 21 and the second aspherical mirror 31 are, for example, concave mirrors, and are optical members that reflect and magnify the display light projected from the display device 11 and that guide the display light to the windshield 51. In other words, the first aspherical mirror 21 and the second aspherical mirror 1 are reflective members. More specifically, the first aspherical mirror 21 reflects the display light from the display device 11 toward the second aspherical mirror 31, and the second aspherical mirror 31 reflects the reflected light from the first aspherical mirror 21 toward the windshield 51. The first aspherical mirror 21 and the second aspherical mirror 31 are used to eliminate various types of optical defects, as well to perform an optical path changing operation and a magnifying operation of a display image. For example, the first aspherical mirror 21 and the second aspherical mirror 31 are used to add a function of eliminating distortion of the display image or a function of eliminating a binocular disparity.

Figure 2:
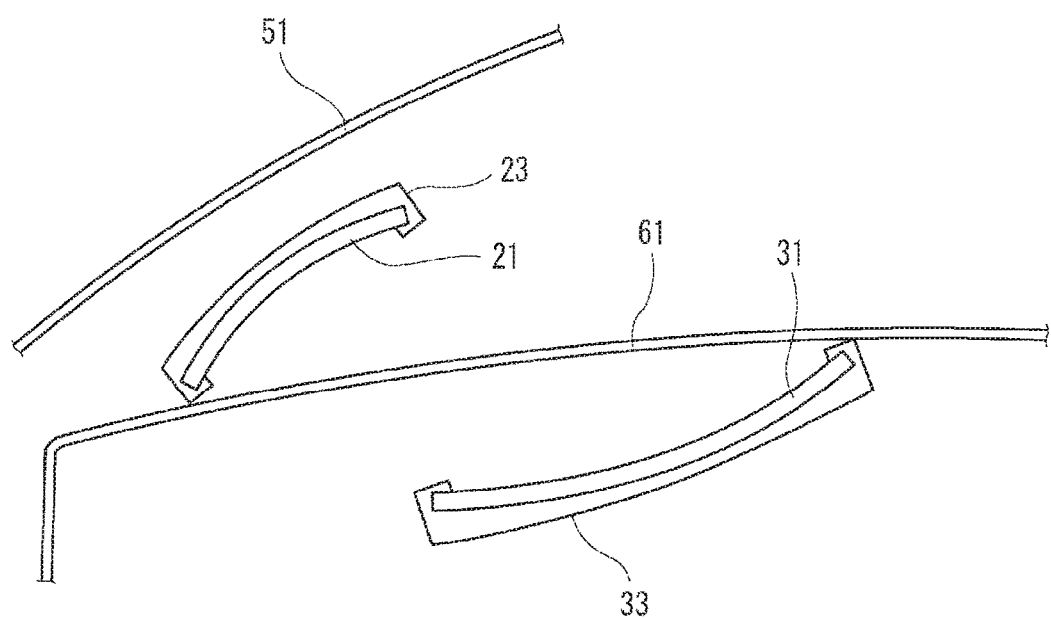
FIG. 2 is a side view illustrating a holding structure of a first aspherical mirror and a second aspherical mirror.

The first aspherical mirror 21 and the second aspherical mirror 31 are made of glass in the present embodiment, and are held to be accommodated in holders 23 and 33 which have a rear surface made of a resin, as illustrated in FIG. 2, The resin holders 23 and 33 are held with respect to the instrument panel 61. The second aspherical mirror 31 is disposed to have a reflective surface that faces upward (the windshield 51 side) along the top surface of the instrument panel 61, and is disposed at a position at which the driver U does not visually recognize the second aspherical mirror. The first aspherical mirror 21 is disposed to have a reflective surface that faces downward (the second aspherical mirror 31 side).

In addition, the first aspherical mirror 21 and the second aspherical mirror 31 are formed to have a larger size (in other words, a large principal surface in the horizontal and vertical directions) than in the related art. This is because the HUD apparatus 1 displays an image having a wider perspective than in the related art.

Further, the first aspherical mirror 21 and the second aspherical mirror 31 are made of any material, and there is no limitation to a method of fixing the mirrors to the instrument panel 61. For example, both the mirrors may be made of a resin. In addition, the configuration in which the entirety of the mirrors are covered with the holders 23 and 33 may not be employed, but a configuration, in which only base end sides of both of the mirrors are fixed to the instrument panel 61 by locking portions extending from both of the mirrors, or a configuration, in which both the mirrors are fixed to the instrument panel by adhesion or pinning, may be employed.

In addition, the first aspherical mirror 21 and the second aspherical mirror 31 are formed to have a larger size (in other words, a large principal surface in the horizontal and vertical directions) than in the related art. This is because the HUD apparatus 1 displays an image having a wider perspective than in the related art.

When such large-sized optical members are disposed inside the instrument panel 61, it is difficult to avoid the optical members interfering with a structural body or a functional component inside the instrument panel 61.

In this respect, in the HUD apparatus 1, since the entirety of the first aspherical mirror 21 is disposed outside the instrument panel 61, it is possible to reduce occurrence of interference of the optical members with a structural body or a functional component which is disposed inside the instrument panel 61 and thus, it is possible to realize space saving so as to improve mountability even in the case where a large-sized optical member is used.

First Modification Example

First, a problem to be solved by the first modification example is described. In the HUD apparatus 1, in some cases, sunlight transmitted through the windshield 51 is concentrated on the display device 11 via a route reverse to an optical path from the display device 11 to the windshield 51. There is a concern that the concentration of the sunlight may have an adverse effect on the display device 11 or an element disposed on the periphery thereof due to a temperature increase.

Therefore, the HUD apparatus according to the first modification example has a configuration in which a laser projecting type display device, which projects light having a predetermined narrow wavelength band, is used as the display device 11, and the first aspherical mirror 21 is used as a band-stop filter that reflects only light having the narrow wavelength band. The laser projecting type display device realizes a full-color display with the display light having respective narrow wavelength bands of RGB. The first aspherical mirror 21 reflects only light having the narrow wavelength band. Hence, it is possible to reduce the amount of the sunlight reaching the display device 11 and it is possible to prevent the adverse effect on the display device 11 or the like.

In addition, in the HUD apparatus according to the first modification example, the holder 23 illustrated in FIG. 2 is formed of a transparent material, or only the base end side of the first aspherical mirror 21 is held without using the holder 23. In this manner, in the HUD apparatus according to the first modification example in which the first aspherical mirror 21 transmits light not having the narrow wavelength band, the first aspherical mirror 21 transmits virtually the entirety of extraneous light. Therefore, a driver can visually recognize an outside sight through the first aspherical mirror 21. As a result, it is possible to enhance a design quality thereof.

Second Modification Example

Similar to the first modification example, an object of the second modification example is to prevent an adverse effect of the sunlight on the display device 11 or the like.

In the HUD apparatus according to the second modification example, at least one of the first aspherical mirror 21 or the second aspherical mirror 31 is subjected to infrared transmission processing. For example, the infrared transmission processing is performed by forming an IR cut filter formed of an optical thin film. In this manner, it is possible to reduce the amount of the infrared rays, which is contained in the sunlight, reaching the display device 11 and thus, it is possible to prevent an adverse effect on the display device 11 or the like.

A technical scope of the present invention is not limited to the embodiments described above. The embodiments described above can be altered or modified in various ways within the technical scope of the present invention.

For example, in the present embodiment, it is described that the entirety of the first aspherical mirror 21 is positioned outside the instrument panel 61; however, in order to improve mountability, at least a part of the first aspherical mirror 21 may be positioned outside the instrument panel 61. In addition, a configuration, in which at least a part of the second aspherical mirror 31 is positioned outside the instrument panel 61, may also be employed.

In addition, an example, in which the present embodiment is applied to the configuration in which both the first aspherical mirror 21 and the second aspherical mirror 31 are used as the reflective members, is described; however, the embodiment may be applied to a configuration in which a transmission type optical member (for example, refer to a plano-concave lens 15 in FIG. 1 in PTL 1) such as in an HUD apparatus disclosed in PTL 1 described above, and a configuration, in which at least a part of the transmission type optical member is disposed outside the instrument panel 61, may be employed. In addition, a configuration, in which a single optical member is used, may be employed, or a configuration, in which three or more optical members are used, may be employed.

In addition, in the present embodiment, an example, in which the driver U visually recognizes the display light reflected from the windshield 51, is described; however, a configuration may be employed, in which a combiner (not illustrated) is used instead of the windshield 51.

Hereinafter, the HUD apparatus according to the embodiment is summarized.

(1) The HUD apparatus 1 according to the embodiment includes: the display device 11 that is provided inside the instrument panel 61 and projects display light having a certain wavelength band; and the at least one optical member (first aspherical mirror 21) that reflects or transmits the display light projected from the display device 11 so as to guide the display light to the windshield 51 or a combiner. The at least one optical member includes the optical member (first aspherical mirror 21) which reflects only light having the wavelength band. At least a part of the at least one optical member is positioned outside the instrument panel 61.

(2) In the HUD apparatus according to the second modification example, the at least one optical member includes the optical member which is subjected to processing of transmitting an infrared ray.

The present invention is described in detail with reference to a specific embodiment; however, it is clear for those skilled in the art that it is possible to perform various alterations or modifications without departing from the spirit and range of the present invention.

According to the present invention, it is possible to provide a head-up display apparatus which is improved in mountablility. The present invention, which achieves the effect, is applicable to a head-up display apparatus.

What is claimed is:
1. A head-up display apparatus comprising:
 a display device that is provided inside an instrument panel and projects display light having a certain wavelength band in the visible wavelength band; and an optical member that reflects or transmits the display light projected from the display device so as to guide the display light to a windshield or a combiner, wherein the optical member includes a first optical member and a second optical member, wherein the first optical member reflects only light having the certain wavelength band, wherein the first optical member reflects the display light projected from the display device, and the second optical member directly reflects the display light from the first optical member toward the windshield or the combiner, and wherein the first optical member is positioned outside the instrument panel and the second optical member is positioned inside the instrument panel.

2. The head-up display apparatus according to claim 1, wherein at least one of the first and second optical members is subjected to infrared transmission processing.

3. The head-up display apparatus according to claim 1, wherein the first optical member is a first mirror, and the second optical member is a second mirror.

4. The head-up display apparatus according to claim 1, wherein at least one of the first and second optical members is a concave mirror.

5. The head-up display apparatus according to claim 1, wherein the second optical member is positioned entirely inside the instrument panel.

6. The head-up display apparatus according to claim 1, wherein the certain wavelength band is narrow wavelength bands of RGB.

7. The head-up display apparatus according to claim 1, wherein the optical member is configured to include only two members of the first optical member and the second optical member.

* * * * *